United States Patent
Provence et al.

[19]

[11] Patent Number: 6,141,739
[45] Date of Patent: Oct. 31, 2000

[54] MEMORY INTERFACE SUPPORTING ACCESS TO MEMORIES USING DIFFERENT DATA LENGTHS

[75] Inventors: John D. Provence, Mesquite; Ian L. Bower, Dallas; Paul Eaves, Garland; Craig L. Dalley, Plano, all of Tex.

[73] Assignee: Texas Instruments Incorporated, Dallas, Tex.

[21] Appl. No.: 08/956,411

[22] Filed: Oct. 23, 1997

[51] Int. Cl.[7] .................................................. G06F 12/02
[52] U.S. Cl. .......................................... 711/211; 711/219
[58] Field of Search ................................ 711/5, 105, 211, 711/212, 219

[56] References Cited

U.S. PATENT DOCUMENTS

| | | | |
|---|---|---|---|
| 4,796,221 | 1/1989 | Tokumitsu | 364/900 |
| 5,175,835 | 12/1992 | Beighe et al. | 395/425 |
| 5,301,278 | 4/1994 | Bowater et al. | 395/275 |
| 5,918,242 | 6/1999 | Sarma et al. | 711/5 |
| 6,016,537 | 1/2000 | Hansen et al. | 711/211 |

*Primary Examiner*—Eddie P. Chan
*Assistant Examiner*—Kevin Verbrugge
*Attorney, Agent, or Firm*—Wade James Brady, III; Frederick J. Telecky, Jr.

[57] ABSTRACT

A computing device (10) includes a processor (14) coupled to a memory interface (28). The memory interface (28) supports access to a variety of memories (12) using at least two different data lengths. The memory interface (28) includes an address register (50, 52) for receiving addressing information to access the memory (12). A mode bit (80) and a high/low bit (82) in the address register (50, 52) determine the different operating modes of the memory interface (28).

12 Claims, 4 Drawing Sheets

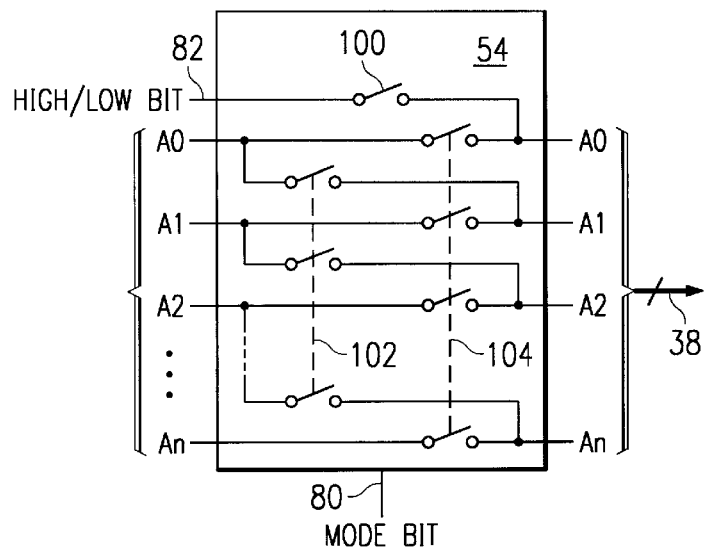
FIG. 3
| MEMORY TYPE | | ADDRESS CONTROL | |
|---|---|---|---|
| STANDARD/DRAM | NARROW/WIDE | MODE BIT | HIGH/LOW BIT |
| S | W | X | X |
| S | N | 0 | X |
| S | N | 1 | 0 |
| S | N | 1 | 1 |
| D | X | 0 | X |
| D | N | 1 | 0 |
| D | N | 1 | 1 |
| D | W | 1 | 0 |
| D | W | 1 | 1 |
FIG. 4
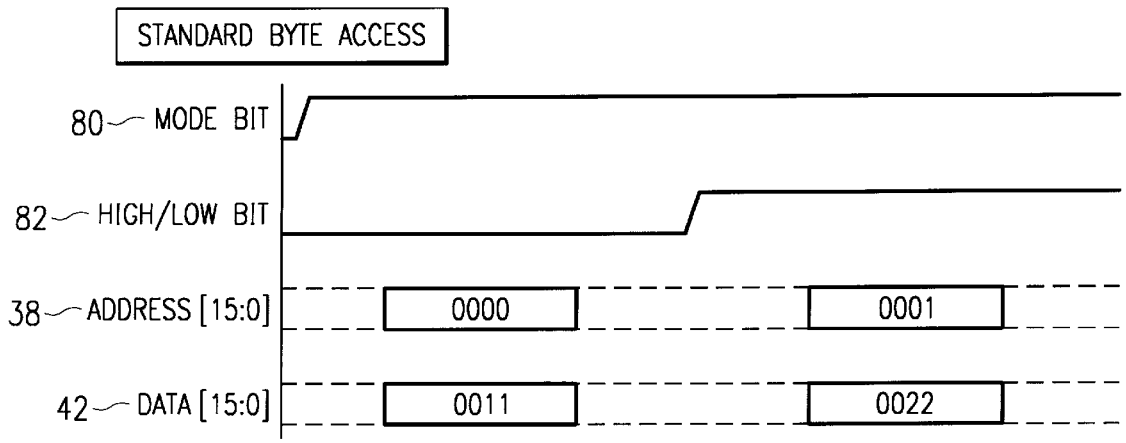
FIG. 5

6,141,739

MEMORY INTERFACE SUPPORTING ACCESS TO MEMORIES USING DIFFERENT DATA LENGTHS

TECHNICAL FIELD OF THE INVENTION

This invention relates in general to computing devices, and more particularly to programmable memory access for computing devices.

BACKGROUND OF THE INVENTION

A computing device includes a processor to execute instructions and a memory to store the instructions and associated data. Often the memory accessed by the processor is integral to the device and operates in a specific and expected manner. However, some computing devices may access memory that is external to the core processing function of the computing device. To maintain flexibility and cost efficiency, these computing devices should be able to access a variety of different memories.

Existing computing devices may incorporate an external memory interface that allows access to dynamic random access memories (DRAMs) of varying bit widths. Similarly, this interface may support static RAMs, read-only memory (ROM) devices, flash memories, and other standard memories of varying bit widths. However, these existing computing devices perform memory accesses (reads and writes) on a fixed bit width basis. For example, each read of a four bit wide DRAM is actually four consecutive four bit reads of the DRAM. Memory interface circuitry automatically performs the four consecutive reads, builds the sixteen bit word in a data register, and places the word on the processor data lines. This known technique processes data occupying each of the processor data lines, which may present certain disadvantages and drawbacks for some newer memory devices.

SUMMARY OF THE INVENTION

In accordance with the present invention, the disadvantages and problems associated with memory access in computing devices has been substantially reduced or eliminated. In particular, the present invention provides flexible and programmable access to a variety of memories with a reduced complexity in the memory interface circuitry.

In accordance with one embodiment of the present invention, a computing device includes a processor having a plurality of processor data lines and a memory. A memory interface is coupled to the processor using the processor data lines and to the memory. In a first mode, the memory interface communicates between the memory and the processor first data occupying each of the processor data lines. In a second mode, the memory interface communicates between the memory and the processor second data occupying a portion of the processor data lines.

Important technical advantages of the present invention include a computing device having a memory interface that supports flexible and programmable access to a variety of different memories. In a particular implementation, the value of a mode bit and a high/low bit determines the operation of the memory interface. For example, using sixteen processor data lines, the value of the mode bit specifies either sixteen bit (word) or eight bit (byte) access to the memory. In the byte access mode, the memory interface places data read from memory on a portion, such as the lower half, of the processor data lines. For DRAM access, the mode bit also causes a controller/counter to generate appropriate bit counts and nibble counts to place bits or nibbles retrieved from memory on portions of the processor data lines. The high/low bit specifies either the high or low byte to be accessed for non-DRAM or standard memory access, and determines the range of bits or nibbles specified by the controller/counter for DRAM access.

Further technical advantages of the present invention include a register that stores the type of memory accessed by the processor, a logic module that implements the mode bit and high/low bit, as well as increment circuitry that performs memory access on an incremented or non-incremented basis.

BRIEF DESCRIPTION OF THE DRAWINGS

For a more complete understanding of the present invention, and for further features and advantages, reference is now made to the following description taken in conjunction with the accompanying drawings, in which:

FIG. 3 illustrates a logic module for use in the external memory interface;

FIG. 4 is a table of programmable values that illustrate the various modes of operation of the external memory interface;

FIG. 5 is a timing diagram for access to a standard memory;

DETAILED DESCRIPTION OF THE INVENTION

Figure 1:
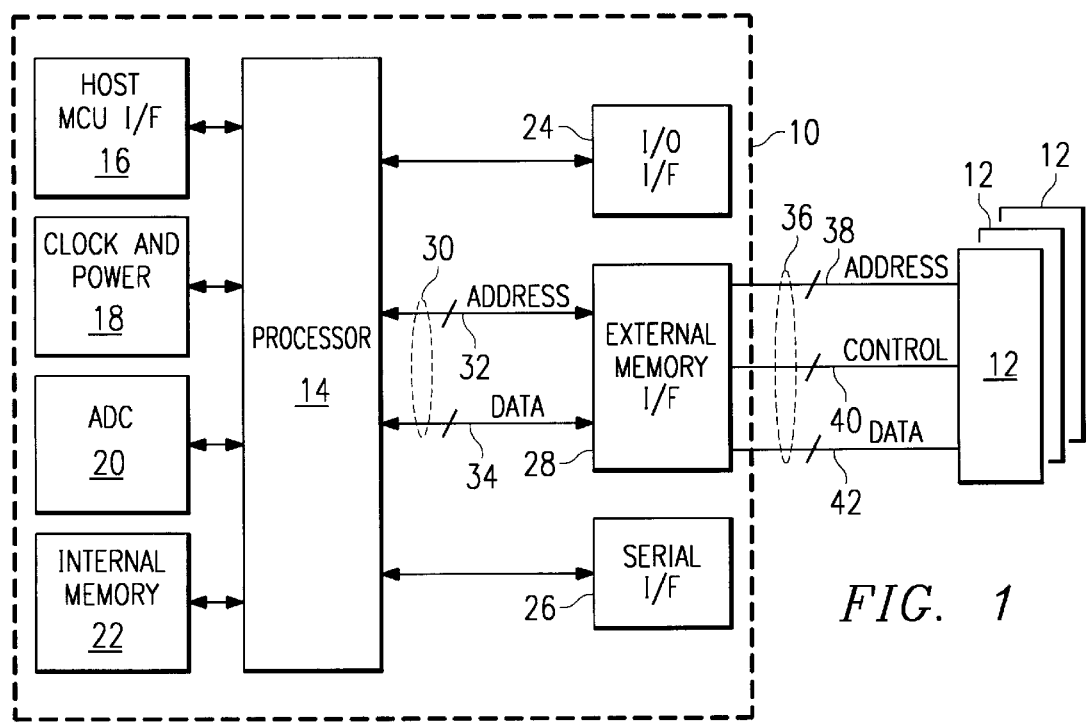
FIG. 1 illustrates a computing device coupled to an external memory.

FIG. 1 illustrates a computing device 10 coupled to a variety of external memories 12. Memories 12 may comprise dynamic random access memory (DRAM), static RAM (SRAM), programmable read-only memory (PROM), flash memory, a memory-mapped peripheral, or any other memory device. For convenience, memory 12 falls into two categories: DRAMs and all other memories that are not DRAMs, referred to generally as standard memories. In operation, computing device 10 accesses (reads and writes) memory 12 using different lengths of data and different modes of operation.

Computing device 10 includes a processor 14 coupled to a host microprocessor control unit interface 16, a clock and power source 18, an analog-to-digital converter (ADC) 20, and an internal memory 22. Also coupled to processor 14 is an input/output interface 24 and a serial interface 26. In a particular embodiment, computing device 10 comprises a digital signal processor (DSP) that performs signal processing functions, control functions, or both.

An external memory interface 28 is coupled to processor 14 using a processor bus 30 having processor address lines 32 and processor data lines 34. Memory interface 28 is also coupled to memory 12 using memory bus 36 having memory address lines 38, memory control lines 40, and memory data lines 42. In general, memory interface 28 supports DRAM, SRAM, ROM, EPROM, EEPROM, flash memory, and memory-mapped peripherals, allowing a wide range of system configurations with little or no external glue logic. This provides a significant technical advantage that affords flexible and cost efficient use of a variety of memories 12 in a variety of access scenarios.

In operation, memory interface 28 communicates data between processor 14 and memory 12 using a first memory access mode and a second memory access mode. In the first mode, memory interface 28 communicates first data between processor 14 and memory 12, wherein the first data occupies each of the processor data lines 34. In a second mode, memory interface 28 communicates second data between processor 14 and memory 12, wherein the second data occupies a portion of processor data lines 34.

In a particular example, processor data lines 34 comprise a sixteen bit data bus accessed by processor 14. In the first mode, memory interface 28 supports traditional sixteen bit word operation for a memory access (read or write) to memory 12. For standard memory access this may involve successive accesses to a low byte and a high byte in memory 12. For DRAM access, this may involve four successive accesses to four bit nibbles or sixteen successive accesses to individual bits. In either case, memory interface 28 constructs a sixteen bit word for presentation on each of the processor data lines 34 while operating in the first mode.

In the second mode, memory interface 28 supports eight bit byte access to memory 12 using a portion of processor data lines 34. For standard memory access, memory interface 28 accesses a single byte (low or high, even or odd) from memory 12. For DRAM access, memory interface 28 accesses two successive nibbles or eight successive individual bits in memory 12. In either case, memory interface 28 constructs an eight bit byte for presentation on a portion, for example the lower half, of the processor data lines 34 while operating in the second mode.

Figure 2:
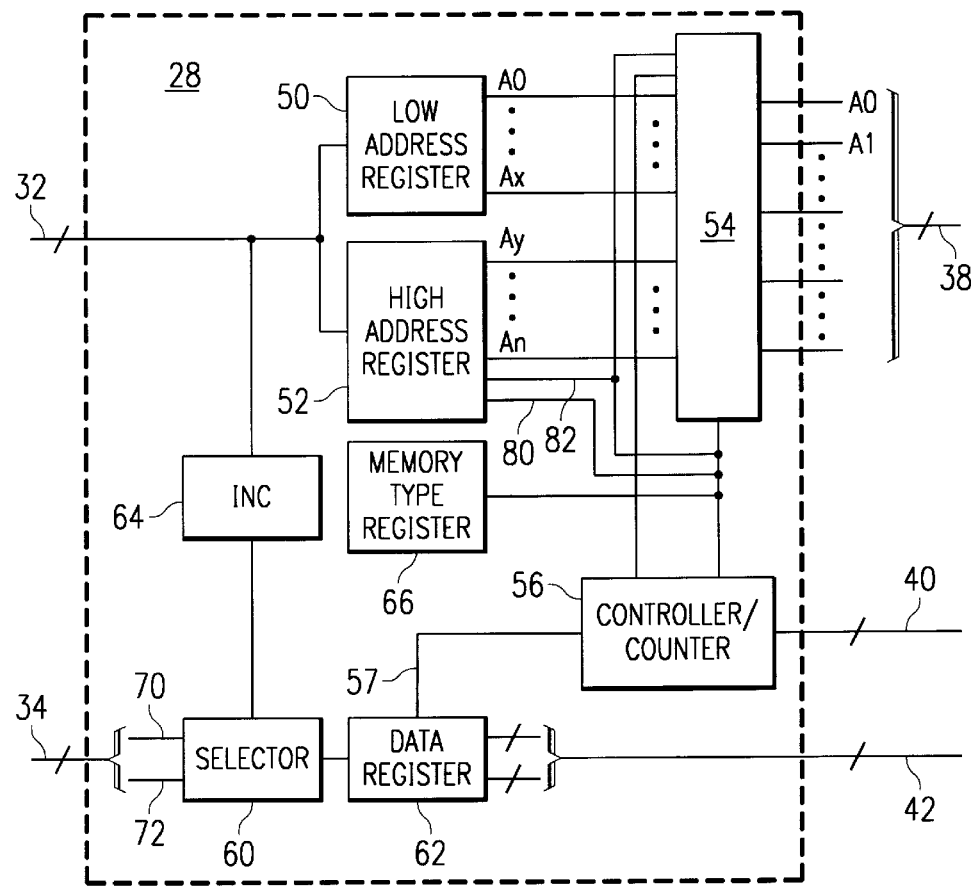
FIG. 2 illustrates an external memory interface for the computing device.

FIG. 2 illustrates in more detail memory interface 28. A low address register 50 and a high address register 52 are coupled to processor address lines 32. A logic module 54 couples selected output from registers 50 and 52 to memory address lines 38. It should be understood that memory interface 28 may be implemented using a single address register or multiple address registers.

Processor data lines 34 are coupled to selector 60, which is in turn coupled to data register 62 having lines coupled to memory data lines 42. Selector 60 is also coupled to increment module 64, which is in turn coupled to address registers 50 and 52. A controller/counter 56 is coupled to memory control lines 40, as well as to logic module 54, data register 62, and selected outputs from high address register 52. Controller/counter 56 provides a bit count, nibble count, byte count or other information (referred to generally by reference numeral 57) to properly construct data in data register 62 for access by processor 14. A memory type register 66 stores information on memory 12 for access by controller/counter 56.

Processor 14 accesses registers 50, 52, and 62 by input/output mapping to specific addresses associated with these registers. For example, processor 14 can write addressing information to low address register 50 by specifying its address and supplying the address on processor address lines 32. Similarly, processor 14 can read data from data register 62 by specifying its address and gathering the data on processor data lines 34. Data register 62 may be mapped to two different addresses, shown graphically as increment address 70 and non-increment address 72. In this particular embodiment, the operation of selector 60 and increment module 64 depends on whether processor 14 accesses data register 62 using increment address 70 or non-increment address 72, as described below.

Generally, memory interface 28 receives addressing information from processor 14 using processor address lines 32. This information is maintained in address registers 50 and 52 and provided through logic module 54 to memory address lines 38. Upon specifying a particular address in memory 12 and the specific access mode desired, processor 14 can either read data from or write data to memory 12. To read data, controller/counter 56 asserts the proper control signals on memory control lines 40 to receive data at data register 62 using memory data lines 42. Processor 14 then accesses this data using processor data lines 34 by selecting either incremented address 70 or non-incremented address 72. By selecting incremented address 70, increment module 64 automatically causes low address register 50 and high address register 52 to store the next address in memory 12 for access by memory interface 28. By selecting non-incremented address 72, increment module 64 does not automatically increment the address, and processor 14 supplies the new addressing information to address registers 50 and 52 for the next memory access.

To write data, processor 14 provides data to data register 62 using incremented address 70 or non-incremented address 72. Processor 14 also provides addressing information to address registers 50 and 52 using processor address lines 32. Controller/counter 56 provides the appropriate control signals on control lines 40 to write data specified on memory data lines 42 to the address specified on memory address lines 38. Writing data using incremented address 70 causes increment module 64 to supply the next address for loading in address registers 50 and 52. Increment module 64 does not specify the next address if processor 14 writes data to memory 12 using non-incremented address 72.

Memory interface 28 includes two bits stored in high address register 52 that specify, at least in part, the operational mode of memory interface 28. Specifically, these addressing control bits support memory operations using reduced length data that occupies a portion of processor data lines 34. A mode bit 80 is stored as the most significant bit of high address register 52 and specifies whether memory interface 28 is in the first mode to operate on first data occupying each of processor data lines 34 or in a second mode for operating on second data occupying a portion of processor data lines 34. High/low bit 82 is stored as the second most significant bit in high address register 52 and specifies the proper address for data using logic module 54 or specifies the proper operation of controller/counter 56.

FIG. 3 illustrates logic module 54 for use in memory interface 28. When mode bit 80 is in a first state specifying the first mode, high/low bit 82 is ignored by opening switch 100. In this mode, switches 102 are open and switches 104 are closed to accomplish a direct mapping from the output of address registers 50 and 52 to memory address lines 38.

When mode bit 80 is in a second state specifying the second mode, switch 100 is closed so that high/low bit 82 specifies the least significant bit (A0) of memory address lines 38. Also, switches 102 are closed and switches 104 are open to shift the remaining address bits provided from address registers 50 and 52 by one bit position on memory address lines 38. In this manner, logic module 54 specifies the appropriate address to access, for example, a single byte of data stored in standard memory 12.

FIG. 4 is a table 200 that specifies values in memory type register 66 as well as values of mode bit 80 and high/low bit 82 for the various modes of operation of memory interface 28. This discussion of the various operating modes of memory interface 28 will refer to a specific implementation in which the first mode corresponds to a sixteen bit (word) access and the second mode corresponds to an eight bit (byte) access. However, it should be understood that the teachings of the present invention contemplate any particular architecture, bit count, nibble count, numbers of address or data lines, or other variations that allow memory access using two different data lengths.

Table 200 includes memory type parameters, including a standard/DRAM designation 202 and a narrow/wide designation 204. In addition, table 200 includes addressing control parameters, such as mode bit 80 and high/low bit 82 discussed above.

The first four entries in table 200 refer to standard memory access, designated by an "S" in the first column. Entry 210 represents a word access using a sixteen bit wide standard memory. In this case, since byte access is not possible, memory interface 28 ignores both mode bit 80 and high/low bit 82. Entry 212 represents a traditional word access using a narrow memory 12, in which a sixteen bit word is constructed using two successive eight bit accesses to memory 12. Entries 210 and 212 represent the first mode of operation of memory interface 28 using standard memory. Entries 214 and 216 represent standard memory access on a byte level, indicated by asserted mode bit 80. High/low bit 82 specifies the high or low byte to be accessed. Entries 214 and 216 represent the second mode of operation of memory interface 28 using standard memory.

Entry 218 represents DRAM word access. In this particular embodiment, the data may comprise, for example, a build of four nibbles or sixteen bits. Entry 218 represents the first mode of memory interface 28 using DRAM. Entries 220 and 222 represent byte access using one bit wide DRAMs, where high/low bit 82 specifies a one bit width memory 12 and causes controller/counter 56 to specify the appropriate bit count to properly construct the byte in data register 62. Similarly, entries 224 and 226 represent byte access using a four bit wide DRAM. In this case, high/low bit 82 specifies a four bit width memory 12 and causes controller/counter 56 to specify the appropriate nibble count to properly construct the byte in data register 62.

Figure 6:
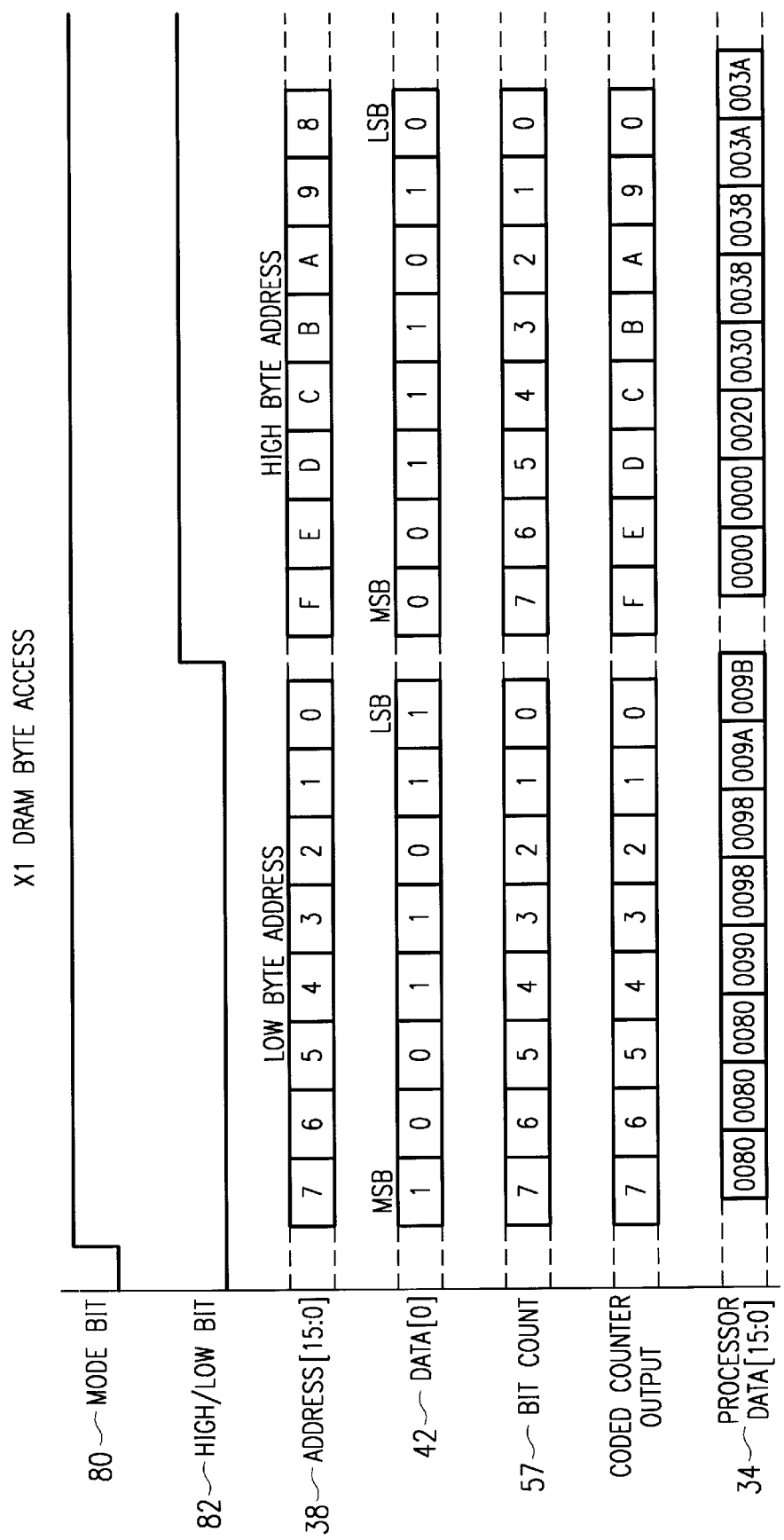
FIG. 6 is a timing diagram for access to a one bit wide DRAM.
Figure 7:
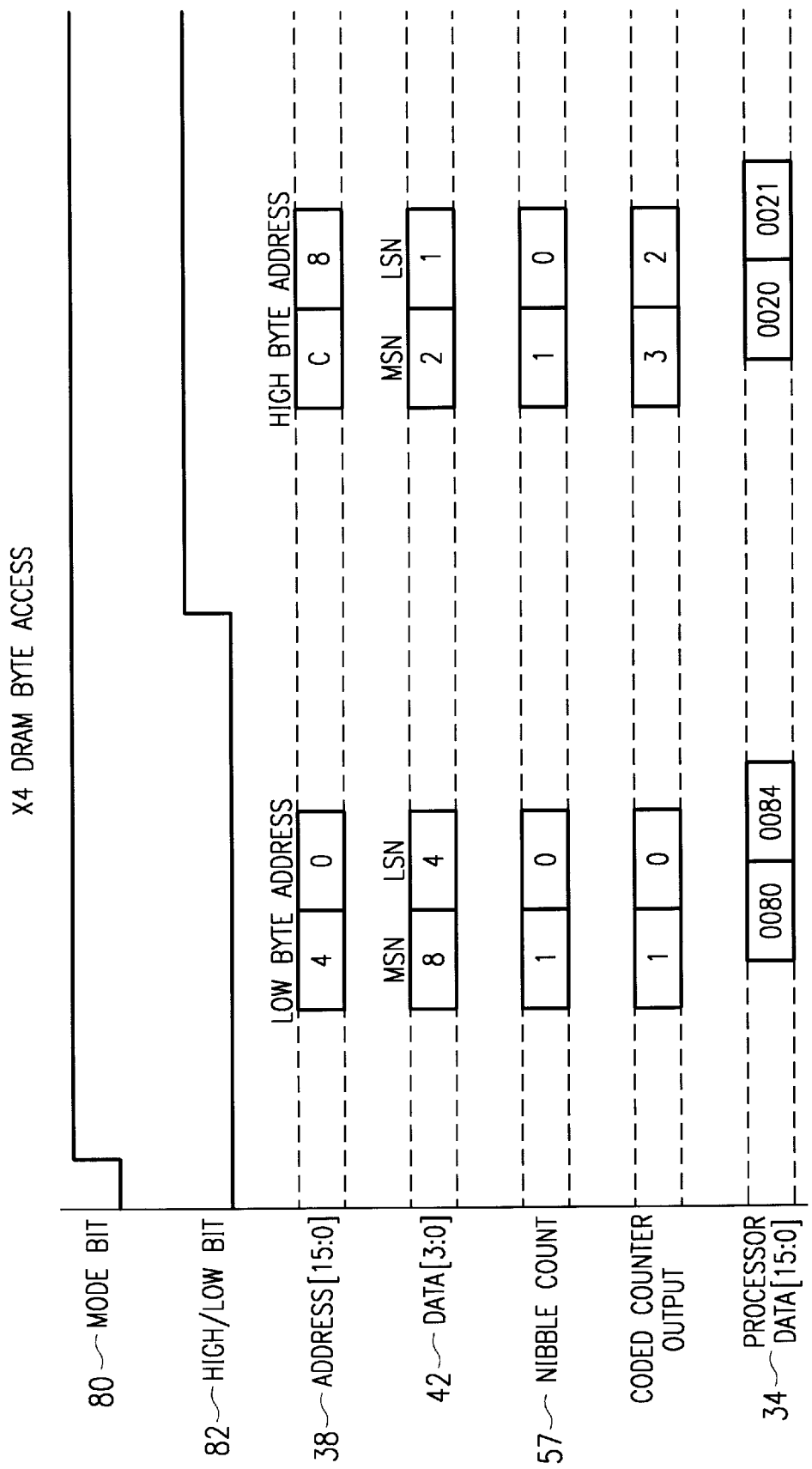
FIG. 7 is a timing diagram for access to a four bit wide DRAM.

FIGS. 5–7 are timing diagrams that illustrate the operation of memory interface 28 for a variety of different memories 12. Again, as a matter of convenience, the timing diagrams are discussed with reference to a particular implementation of memory interface 28 that supports both sixteen bit (word) and eight bit (byte) access to memory 12. It should be understood that the present invention contemplates any environment and operation of memory interface 28 to support access to a variety of memories 12 using at least two different data lengths. FIGS. 5–7 illustrate a read operation, and a write operation to memory 12 would proceed in a similar manner.

FIG. 5 is a timing diagram that illustrates the operation of memory interface 28 corresponding to entries 214 and 216 of table 200 shown in FIG. 4, specifically, byte access to a standard memory 12, such as an SRAM, ROM, or flash memory. FIG. 5 illustrates over time the value of mode bit 80, high/low bit 82, memory address lines 38, and memory data lines 42. In this particular embodiment, there are sixteen memory address lines 38 [15:0] and sixteen memory data lines 42 [15:0].

In operation, processor 14 initiates a read operation by loading registers 50 and 52 with addressing information and addressing control bits (mode bit 80 and high/low bit 82). In this particular embodiment, mode bit 80 is asserted and high/low bit 82 is not asserted to indicate a second mode of operation in which memory interface 28 accesses a single low byte of data from memory 12. The address loaded into registers 50 and 52 is passed through logic module 54 to memory address lines 38. As illustrated by logic module 54, high/low bit 82 occupies the least significant bit (A0) on memory address lines 38 to supply an address containing four nibbles of information (0000). Controller/counter 56 then asserts the appropriate control lines 40 to read the designated byte from memory 12. Memory interface 28 receives the information represented by the lower two nibbles (11) and stores this information in data register 62. In a particular embodiment, the most significant eight bits in data register 62 are set to zeroes, indicating that processor 14 should ignore the high byte of information stored in data register 62 during the second mode of operation.

To read the high byte of information in memory 12, processor 14 loads information into register 52 to assert high/low bit 82. As illustrated by logic module 54, the transition of high/low bit 82 from a zero to a one causes the address specified on memory address lines 38 to increment (0001) to specify the high byte of information in memory 12. Memory interface 28 receives this high byte of information represented by the lower two nibbles (22) and stores this information in data register 62 for access by processor 14 using processor data lines 34. In a particular embodiment, the most significant eight bits in data register 62 are set to zeroes, indicating that processor 14 should ignore the high byte of information in data register 62 during the second mode of operation.

FIG. 6 is a timing diagram illustrating byte access to a one bit wide DRAM, which corresponds to entries 220 and 222 in table 200 of FIG. 4. For each byte access, memory interface 28 performs eight successive bit reads from memory 12 by specifying an address for each bit on memory address lines 38. For each bit read, memory interface receives the bit on the least significant memory data line 42 and stores the bit at the appropriate bit position in data register 62 as specified by bit count 57 received from controller/counter 56. For example, memory interface 28 receives the bits and stores them in sequence from bit count seven down to bit count zero to construct the low byte of information retrieved from the one bit wide DRAM. As data register 62 constructs the retrieved byte in its eight least significant bits, processor data lines 34 reflect the value of low byte as it is being constructed. After loading the least significant bit into data register 62, processor 14 accesses the final value of low byte (9B) using a portion of processor data lines 34.

In a similar fashion, memory interface 28 accesses the high byte of information in memory 12 by first asserting high/low bit 82 stored in high address register 52 and successively specifying addresses of the eight bits of information for retrieval from memory 12 to construct the high byte. Memory interface 28 receives the bits and stores them in sequence from bit count seven to bit count zero, as specified by bit count 57, to construct the high byte in data register 62. Since memory interface 28 implements a true byte access in its second mode, bit count 57 specifies the bit positions to place the high byte retrieved from memory 12 into the least significant bits of data register 62. Again, as memory interface 28 places the data retrieved from memory 12 in data register 62, processor data lines 34 indicate the running value of high byte during construction. Processor 14 accesses the final value of high byte (3A) using a portion of processor data lines 34.

FIG. 7 is a timing diagram illustrating byte access to a four bit wide DRAM, which corresponds to entries 224 and 226 in table 200. The byte access using a four bit wide DRAM proceeds in a similar fashion as the byte access using a one bit wide DRAM, but memory interface 28 specifies addresses and receives data on a nibble basis. For each byte, memory interface 28 specifies two addresses on memory address lines 38 corresponding to two nibbles of information in memory 12. Memory interface 28 receives data sequentially as the most significant nibble (MSN) and the least significant nibble (LSN) on memory data lines 42 and places these nibbles into the appropriate location in data register 62 as specified by nibble count 57 generated by controller/counter 56. Upon receiving and storing the least significant nibble, processor 14 accesses the final value of the byte using a portion of processor data lines 34.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A computing device comprising:
    a processor having a plurality of processor data lines and a plurality of processor address lines;
    a memory having a plurality of memory address lines; and
    a memory interface coupled to the processor using the processor data lines and to the memory, the memory interface having a first mode operable to communicate between the memory and the processor first data occupying each of the processor data lines, the memory interface having a second mode operable to communicate between the memory and the processor second data occupying a portion of the processor data lines;
    the memory interface comprising an address register coupled to the processor address lines and a logic module coupled to the address register and to the memory address lines, the address register providing a plurality of address bits, a mode bit having a first state specifying the first mode and a second state specifying the second mode, and a high/low bit, the logic module responsive to the mode bit having the first state to directly map the address bits provided by the address register to the memory address lines and responsive to the mode bit having the second state to couple the high/low bit to the least significant bit of the memory address lines and shift the address bits provided by the address register by one position on the memory address lines.

2. The computing device of claim 1, wherein the first data comprises a sixteen bit word and the second data comprises an eight bit byte.

3. The computing device of claim 1, wherein the memory comprises one of a selected dynamic RAM and static RAM, the memory interface further operable to access the selected memory in the first mode and the second mode.

4. The computing device of claim 1, wherein the memory comprises one of a selected dynamic RAM, static RAM, ROM, and flash memory, the memory interface further operable to access the selected memory in the first mode and the second mode.

5. The computing device of claim 1, wherein the memory interface comprises:
    a low address register providing a plurality of low address bits;
    a high address register providing a plurality of high address bits, the mode bit, and the high/low bit, the processor operable to specify the address bits, the mode bit, and the high/low bit.

6. A memory interface for coupling a processor having a plurality of processor data lines and a plurality of processor address lines to a memory having a plurality of memory data lines and a plurality of memory address lines, the memory interface comprising:
    an address register operable to store a plurality of address bits, a mode bit having a first state specifying a first memory access mode and a second state specifying a second memory access mode, and a high/low bit;
    a data register operable in the first mode to receive first data stored at a memory address specified by the address bits, the data register operable in a second mode to receive second data stored at the memory address specified by the address bits, the first data occupying each of the processor data lines and the second data occupying a portion of the processor data lines; and
    a logic module coupled to the address register, the logic module responsive to the mode bit having the first state to directly map the address bits stored by the address register to the memory address lines and responsive to the mode bit having the second state to couple the high/low bit to the least significant bit of the memory address lines and shift the address bits stored by the address register by one position on the memory address lines.

7. The computing device of claim 6, wherein the first data comprises a sixteen bit word and the second data comprises an eight bit byte.

8. The computing device of claim 6, wherein the address register comprises:
    a low address register having a plurality of low address bits; and
    a high address register having a plurality of high address bits and the mode bit, the low address bits and the high address bits combine to form the memory address.

9. The computing device of claim 6, wherein the address register is further operable to store the high/low bit, the high/low bit specifying one of a high byte or a low byte when the memory comprises a static RAM, the high/low bit specifying a bit width when the memory comprises a dynamic RAM.

10. The computing device of claim 6, further comprising a memory type register that specifies one of a standard memory and a DRAM, the address register further operable to store the high/low bit, the high/low bit specifying one of a high byte or a low byte when the memory type register specifies the standard memory, the high/low bit specifying a bit width when the memory type register specifies a dynamic memory.

11. The computing device of claim 6, further comprising a counter coupled to the data register, the counter in the first mode operable to specify the location of data on each of the processor data lines, the counter in the second mode operable to specify the location of data on a portion of the processor data lines.

12. The computing device of claim 6, further comprising:
    a selector coupled to the data register and associated with a first data address and a second data address; and
    an increment module coupled to the selector, the increment module operable to generate an incremented address for storage in the address register if the data register is accessed using the second data address.

* * * * *

UNITED STATES PATENT AND TRADEMARK OFFICE
CERTIFICATE OF CORRECTION

PATENT NO. : 6,141,739
DATED : October 31, 2000
INVENTOR(S) : John D. Provence, Ian L. Bower, Paul Eaves, and Craig L. Dalley It is certified that error appears in the above-identified patent and that said Letters Patent is hereby corrected as shown below:

Title page,
Under "Filed: Oct. 23, 1997" insert: -- Related U. S. Application Data Provisional application No. 60/028,991, Oct. 23, 1996 --.

Column 1,
After line 3, insert: -- This application claims priority under 35 USC 119(e)(1) of provisional application number 60/028,991, filed 10/23/96. --

Signed and Sealed this

Ninth Day of October, 2001

Attest:

NICHOLAS P. GODICI
Attesting Officer
Acting Director of the United States Patent and Trademark Office